W. R. LANDFEAR.
LATHE FOR TURNING SPOOLS.
No. 170,861. Patented Dec. 7, 1875.
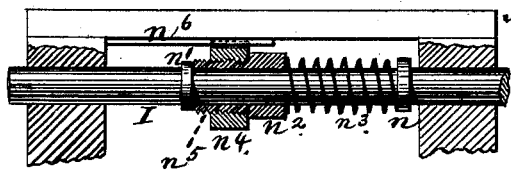
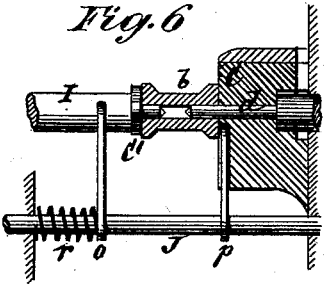
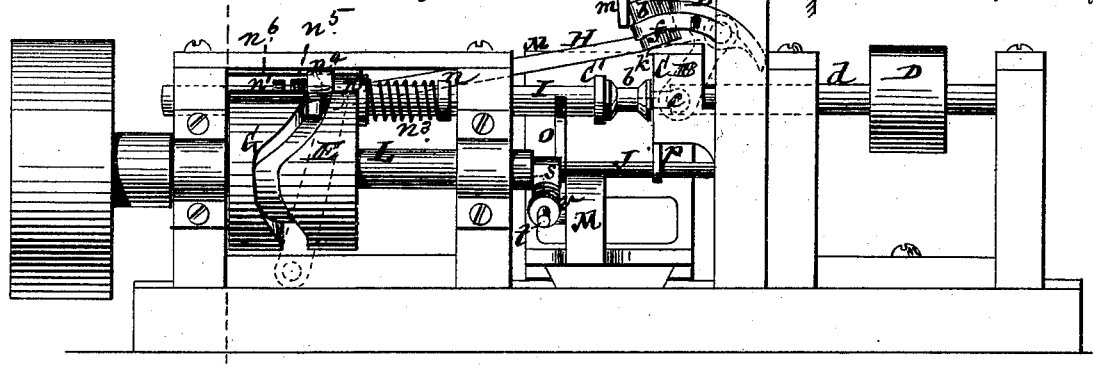
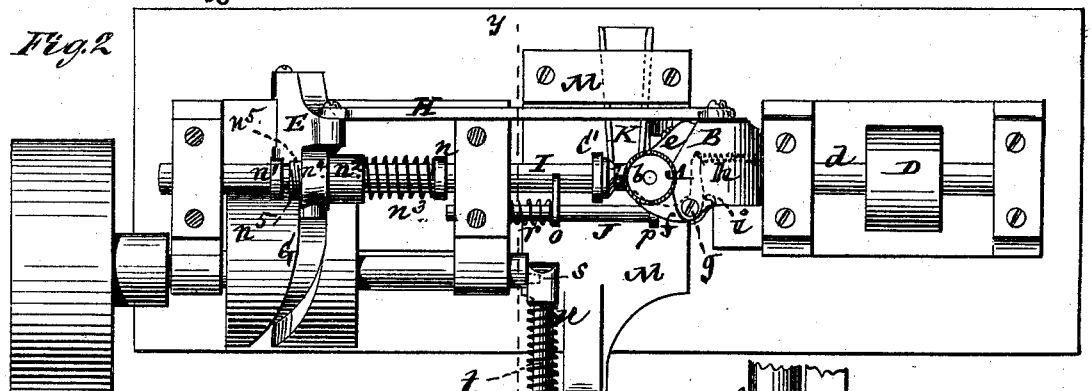
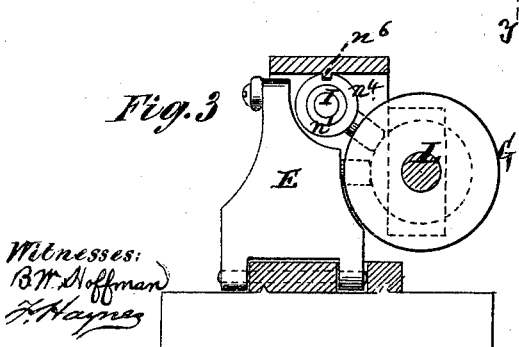
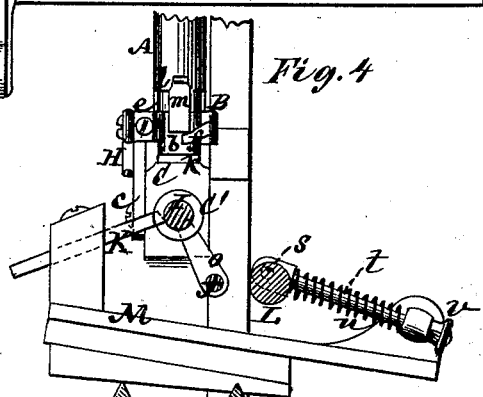

UNITED STATES PATENT OFFICE.

WILLIAM R. LANDFEAR, OF BROOKLYN, NEW YORK, ASSIGNOR TO HIMSELF AND NATHAN E. CAMPBELL, OF HARTFORD, CONNECTICUT.

IMPROVEMENT IN LATHES FOR TURNING SPOOLS.

Specification forming part of Letters Patent No. 170,861, dated December 7, 1875; application filed July 1, 1875.

*To all whom it may concern:*

Be it known that I, WILLIAM R. LANDFEAR, of Brooklyn, in the county of Kings and State of New York, have invented certain new and useful Improvements in Lathes for Turning Spools; and I do hereby declare that the following is a full, clear, and exact description of the same, reference being had to the accompanying drawing, which forms part of this specification.

This invention relates to lathes for turning or facing the ends and barrel portions of spools from blanks or blocks, which are automatically and successively supplied to the lathe.

The invention consists in certain novel constructions and combinations of parts for transferring the spool-blanks to the lathe spindle or centers, for working different-sized spool-blocks, and for keeping up a continuous motion of the lathe, irrespective of any imperfections or irregularities in the blocks.

The spool-blanks may be arranged and conveyed down a fixed tube to the lathe from a hopper above by means substantially as described in Letters Patent No. 156,640, granted to me and Nathan C. Campbell, November 10, 1874.

Figure 1 represents a side elevation of a lathe for turning spools, with my improvements applied. Fig. 2 is a plan of the same; Fig. 3, a vertical transverse section on the line $x\,x$; and Fig. 4, a further vertical transverse section on the line $y\,y$. Fig. 5 is a longitudinal sectional view of the lathe-spindle with its attachments. Fig. 6 is a longitudinal sectional view, in part, of the lathe-spindle and mandrel, cutter-heads, and clearer, in their relation with a spool or spool-blank under operation.

A is the tube, down which the drilled spool-blanks $b$, mounted at their ends one upon the other, are successively conveyed to the operating portions of the lathe. B is a combined cut-off and conveyer of the spool-blanks or blocks for transferring the latter—that is, one at a time—to the lathe-spindle or its centers. This device B has an intermittent rocking action beneath the lower end of the tube A, the same being pivoted at $c$ to the one side of a stationary cutter-head, C, through which the revolving spindle or mandrel $d$ of the lathe works, D being the driving-pulley of said mandrel. The upper surface of B is constructed to form a cut-off to the spool-blocks as they are distributed from the lower end of the tube A, for which purpose said upper surface of the device B is of a flat or spread shape where it sweeps or rocks under the lower end of the tube A. Said device is of a nipper or jaw-like construction at its front end, the one jaw, $e$, being stationary, or, rather, formed of an adjustable gage, to suit different-sized blocks, while the other jaw, $f$, is pivoted at $g$ to open and close, the same being held closed by a spring, $h$, when grasping and taking the spool-blank $b$ from the lower end of the tube A, and conveying it down to the lathe-centers, but being opened, when being thrown or worked back, by an arm of said jaw $f$ striking a pin, $i$, in order that a spool-blank, as it drops from the tube A after the upper surface of the device B has worked backward from under the latter, may be received between the jaws $e\,f$, and in the next forward and downward movement of the device B be transferred, as the spring $h$ closes the jaw $f$, from the surface $k$, over the fixed cutter-head C, down into a horizontal or dressing position. (See Fig. 1.)

When thus transferring a spool-blank the upper surface of the device B acts as a cut-off, to prevent the other spool-blanks in the tube A from dropping out. The front lower portion of the tube A is cut away at $l$, to allow of the lower one in succession of a series of spool-blanks in the tube A being transferred, as described, by the device B, a hinged weight, $m$, at the front of the bottom of said tube serving to prevent the lower spool-blank from dropping till seized by the jaws $e\,f$.

The device B, constructed to operate both as a cut-off and conveyer of the spool-blanks, essentially differs from the mere transferring-nipper of the conveying mechanism described in Letters Patent No. 156,640, hereinbefore referred to.

A rocking motion, as described, is communicated at regular intervals, as required, to the device B by means of a vibrating arm, E, operated by a revolving grooved cam, G, and connected by a rod, H, with the combined spool cut-off and conveyer B.

The cam G also serves to longitudinally reciprocate the lathe-spindle I, for the purpose of entering the hole in the spool-blank at the one end of the latter, after said blank has been lowered by the device B into a horizontal position, and so that when the spindle I is slid forward it forces the spool-blank up onto the mandrel $d$ against the cutter-head C, and between the latter and a cutter-head, C', on the spindle I, the device B in the meantime rising and retiring. The spindle I thus slid forward by the cam is retained by the latter in its advanced position, while the ends of the spool or spool-blank are being forced up or turned by the cutter-heads C C', as said blank is rotated by the mandrel $d$, and while the knife K turns the barrel on the spool. The sliding spindle I is made yielding, whereby the motion of the machine is made continuous, regardless of the spool being long or short, perfect or imperfect. To this end, and to set or gage the spindle to a given length of spool, the spindle I is formed with shoulders $n$ $n^1$, and provided with a sleeve, $n^2$, in advance of the rear one of said shoulders; also with a spring, $n^3$, between the forward end of the sleeve and the front shoulder $n$. The spindle I is free to be forced back through the sleeve $n^2$ against the pressure of the spring $n^3$, to meet any imperfections that may arise, or differences in lengths of the spool-blanks, and the longitudinally-sliding movement of the spindle I is effected by a nut, $n^4$, having a stud or projection arranged to enter the grooved cam G. This nut is fitted on a screw-thread, $n^5$, of the sleeve $n^2$, for the purpose of giving more or less forward set of the spindle to adapt it to spools of different size or length, generally, and it is guided longitudinally by a groove in its outer surface made to fit a feather, $n^6$, to provide for the sliding backward and forward of the spindle by the action of the grooved cam G. Connected with the sliding spindle I is an arm, $o$, at the back of the cutter-head C', said arm being attached at its lower or inner end to a sliding rod, J, carrying a clearer, $p$, and controlled, as regards its forward movement, by a spring, $r$. This rod J, after the spool has been dressed and turned, is forced backward by the other head C' in the backward movement of the spindle I, and as against the pressure of the spring $r$, thereby causing the clearer $p$ to shove the spool from off the mandrel $d$. The grooved cam G is fast on a revolving shaft, L, which has an eccentric pin, $s$, on its forward end, that serves to actuate a rod, $t$, provided with a spring, $u$, and fitted to have a longitudinally-sliding connection with a knife-carriage, M, subject to the action of the spring $u$, and of an adjustable stop or nut, $v$, on the back or outer end of the rod $t$, for the purpose, when dressing the ends of the spool, of bringing up the knife K to turn the barrel on the spool, the carriage M, carrying the knife K, being free to slide transversely. The knife K retires by the back movement of the carriage M, as the clearer $p$ slides by its rod J to discharge the finished spool from off the mandrel to make room for a fresh spool-blank conveyed by the device B from the tube A to the lathe-centers. The yielding driving connection of the knife-carriage M, as provided for by the sliding rod $t$ and spring $u$, serves to admit of the machine continuing its motion, even if the spool block or blank fails to revolve in common with the mandrel $d$, and the nut $v$ provides for the adjustment of the knife K to suit different diameters of spools.

It will thus be seen that no stoppage of the machine is necessary on account of defective spool-blanks.

The cutter-heads C C' may be constructed as in other spool-turning lathes.

I am aware of the patent granted to J. H. Sinkinson, August 11, 1874, No. 153,985, and I disclaim the construction therein shown and described, inasmuch as such is not my invention.

I claim—

1. The combination, with the supply-tube A, of the spool-blank conveyer B, provided with jaws $e$ and $f$, for holding and releasing the spool, and having its upper surface constructed to form a cut-off to the spool-supply tube, as and for the object specified.

2. The sleeve $n^2$, in combination with the sliding spindle I, the stops or collars $n$ $n^1$, the nut $n^4$, adjustable on said sleeve, and the grooved cam G, essentially as specified.

3. The combination of the eccentric pin $s$ on the shaft L with the sliding rod $t$, the spring $u$, the stop or nut $v$, and the knife-carriage M, essentially as described.

4. The combination of the grooved cam G with the vibrating arm E, by which the spool-blank cut-off and conveyer B is operated, and the nut $n^4$, by which the sliding spindle I is actuated, substantially as specified.

WILLIAM R. LANDFEAR.

Witnesses:
BENJAMIN W. HOFFMAN,
JNO. D. PATTEN.